United States Patent
Tsai et al.

(10) Patent No.: US 9,330,215 B2
(45) Date of Patent: May 3, 2016

(54) METHOD AND SYSTEM FOR VERIFYING THE DESIGN OF AN INTEGRATED CIRCUIT HAVING MULTIPLE TIERS

(71) Applicant: Taiwan Semiconductor Manufacturing Co., Ltd., Hsin-Chu (TW)

(72) Inventors: Yao-Hsien Tsai, Zhubei (TW); Chi-Ting Huang, Hsinchu (TW); Cheng-Hung Yeh, Jhunan Township (TW); Hsien-Hsin Sean Lee, Duluth, GA (US)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 127 days.

(21) Appl. No.: 14/219,029

(22) Filed: Mar. 19, 2014

(65) Prior Publication Data

US 2015/0269303 A1    Sep. 24, 2015

(51) Int. Cl.
*G06F 17/50* (2006.01)

(52) U.S. Cl.
CPC ........ *G06F 17/5045* (2013.01); *G06F 17/5081* (2013.01); *G06F 17/504* (2013.01); *G06F 2217/82* (2013.01)

(58) Field of Classification Search
None
See application file for complete search history.

(56) References Cited

U.S. PATENT DOCUMENTS

| | | | | |
|---|---|---|---|---|
| 5,706,206 A * | 1/1998 | Hammer | ............. | G06F 17/5081 716/115 |
| 5,999,726 A * | 12/1999 | Ho | ....... | G06F 17/5081 716/112 |
| 6,185,722 B1 * | 2/2001 | Darden | ............... | G06F 17/5018 716/115 |
| 7,555,737 B2 | 6/2009 | Liu et al. | | |
| 8,146,032 B2 * | 3/2012 | Chen | ................... | G06F 17/5036 716/101 |
| 8,701,066 B1 * | 4/2014 | Lo | ........ | G06F 17/5081 703/14 |
| 8,797,054 B2 * | 8/2014 | Liao | ....... | G06F 17/5036 324/750.03 |
| 8,972,916 B1 * | 3/2015 | Hsieh | ................... | G06F 17/504 716/102 |
| 2013/0033277 A1 | 2/2013 | Liao et al. | | |

FOREIGN PATENT DOCUMENTS

TW         I299831         8/2008

* cited by examiner

*Primary Examiner* — Leigh Garbowski
(74) *Attorney, Agent, or Firm* — Duane Morris LLP

(57) ABSTRACT

A method for verifying the design of an IC having a plurality of tiers includes conducting a layout versus schematic ("LVS") check to separate a plurality of devices of a plurality of design layouts, wherein each design layout corresponds to a respectively different tier having the respective devices. A plurality of adjacent tier connections are generated between one of the devices in respectively different tiers from each other, using a computing device. A first RC extraction for each of the tiers is performed to compute couplings between each of the plurality of devices of the corresponding design layout. A second RC extraction for each of the adjacent tier connections is performed.

20 Claims, 16 Drawing Sheets

METHOD AND SYSTEM FOR VERIFYING THE DESIGN OF AN INTEGRATED CIRCUIT HAVING MULTIPLE TIERS

BACKGROUND

This disclosure relates generally to semiconductor integrated circuits ("ICs") having multiple tiers, and more specifically to electronic design automation ("EDA") and simulation tools for IC design.

A recent trend in semiconductor memories is to fabricate three-dimensional ("3D") semiconductor ICs. 3D ICs include a variety of structures, such as die on silicon interposer, stacked dies, multi-tiered, stacked complementary metal oxide semiconductor ("CMOS") structures, or the like. These 3D circuits offer a host of advantages over traditional two dimensional circuits, such as lower power consumption, higher memory cell density, greater efficiency, alleviating bottlenecks, shorter critical path delays, and lower area cost to name just a few. Stacked die 3D ICs can be constructed by vertically stacking two dimensional chips and providing power and signal communication connections between the chips, such as, for example, using through-substrate vias ("TSV"). Alternatively, 3D IC can be constructed using a single die with integrated components arranged in three dimensions into a plurality of tiers. Each tier can have its own active device layer and/or interconnect structure. Each pair of adjacent tiers are separated from each other by an insulating layer or thin semiconductor substrate or layer.

The design process for various types of new ICs includes several steps using automated EDA tools. During initial schematic design, the designer identifies a set of functions to include in the design, along with their standard delays. The designer uses computer implemented tools to perform functional simulation, to ensure that the design performs its intended function(s). Before the schematic design is laid out, the designer performs a pre-simulation. The pre-simulation takes into account device and cell characteristics, to provide an estimate of circuit performance (i.e., performance in both analog and digital designs, including timing performance in digital designs). If the pre-simulation identifies significant performance issues, the designer modifies the design before proceeding to layout. If the design meets circuit performance requirements in the pre-simulation, the designer initiates the floorplan and layout phases, to generate the actual IC layout, using the place and route engine of the EDA tool. Following the layout process, the user verifies the design by using the EDA tools to perform design rule checks ("DRC"), layout versus schematic ("LVS") checks, and resistance-capacitance ("RC") extraction.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
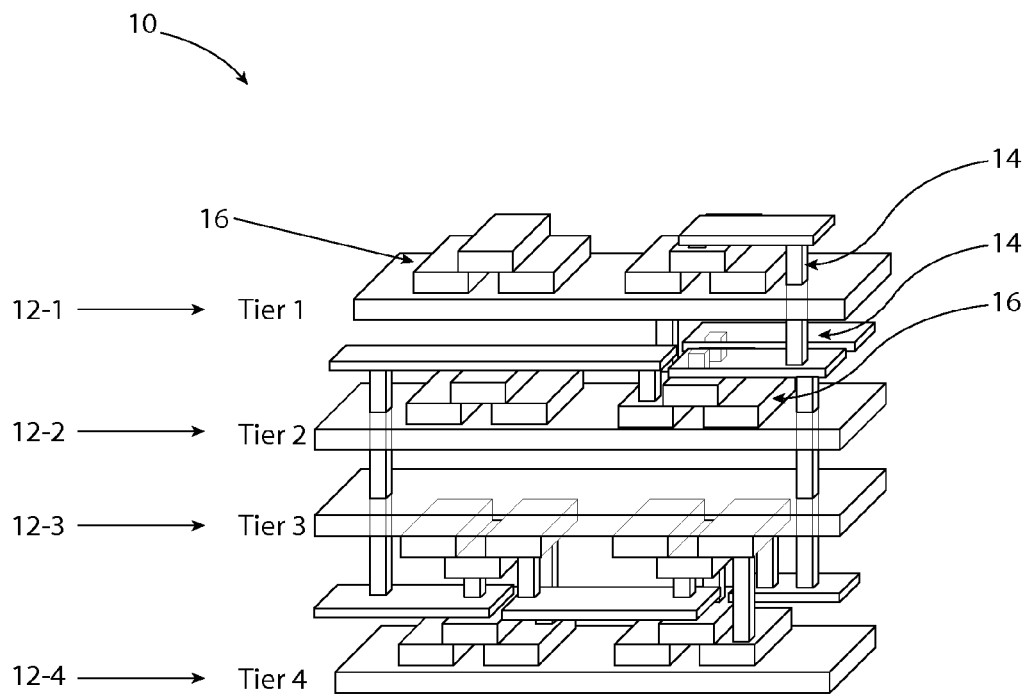
FIG. 1 is a block diagram of one example of a semiconductor integrated circuit (IC) having a plurality of tiers, in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As described above, the design process for various types of new integrated circuits ("ICs") includes several steps using automated electronic design automation ("EDA") tools. One step is to verify a simulated design of an IC by using the EDA tools to perform design rule checks ("DRC"), layout versus schematic ("LVS") checks, and resistance-capacitance ("RC") extraction. In some verification techniques, the RC extraction is performed on a single tier. In the case of an IC having multiple tiers that are, for example, stacked on top of one another, such as a three-dimensional ("3D") IC, the RC extraction is performed on each tier separately. As a result, resistance-capacitance couplings are not assessed for the area between the tiers.

Some embodiments of the method and system described herein facilitate a technique to verify the design of an IC having multiple tiers, such as a 3D IC, such that resistance-capacitance couplings can be assessed for the area between the tiers. In some embodiments, design layouts can be used to separate the tiers and the devices, such as transistor devices, within the tiers. This separation can then facilitate a determination as to the couplings between the devices that are positioned on separate and adjacent tiers (i.e., adjacent tier couplings or tier-to-tier couplings). A first RC extraction can then be performed within each tier to create a database that includes each of the devices that have been separated by tiers. A second RC extraction can be performed for the adjacent tier couplings between the devices. Accordingly, some embodiments described herein provide a technique such that resistance-capacitance couplings between each of the tiers can be determined for the design of the IC.

FIG. 1 illustrates one example of a 3D semiconductor IC 10. 3D IC 10 includes a plurality of tiers or layers, such as tiers 12-1, 12-2, 12-3, and 12-4, that are vertically stacked on top of one another. While only four tiers or layers are shown in FIG. 1, 3D IC 10 can have any suitable number of tiers or layers. In some embodiments, tiers 12-1, 12-2, 12-3, and 12-4 are individual dies or chips, such as two-dimensional (2D) chips, that are electrically coupled to one another with at least one through-substrate via ("TSV") 14 and microbumps. In some embodiments each chip includes at least one port (not shown) such that a TSV can extend from a port on one chip to a port on another chip. In other embodiments, tiers 12-1, 12-2, 12-3, and 12-4 are stacked tiers, that are separated from each other by an insulating dielectric or semiconductor layer and electrically coupled to one another with at least one interlayer via ("ILV") or inter-device via ("ILD") (not shown).

In some embodiments, each tier 12-1, 12-2, 12-3, and 12-4 of 3D IC 10 can include a respective active device layer 16 and a respective interconnect structure, which can include a plurality of conductive line layers (e.g., M1, M2, . . . ) and a plurality of conductive via layers (e.g., V0, V1, V2, . . . ). The active device layers 16 of the first and subsequent tiers can include a thin semiconductor substrate or semiconductor layer. In some embodiments, one or more of the upper tiers, such as tier 12-3 has an interconnect structure, but no active devices, and an insulating layer can be substituted for the thin semiconductor layer. Each respective interconnect structure can include interlayer dielectric ("ILD") layers (not shown) disposed between directly adjacent tiers. As described in more detail below with respect to the remaining figures, in some embodiments, the resistance-capacitance couplings between each tier 12-1, 12-2, 12-3, and 12-4 can be determined for the design of 3D IC 10 by using EDA tools (not shown in FIG. 1).

Figure 2:
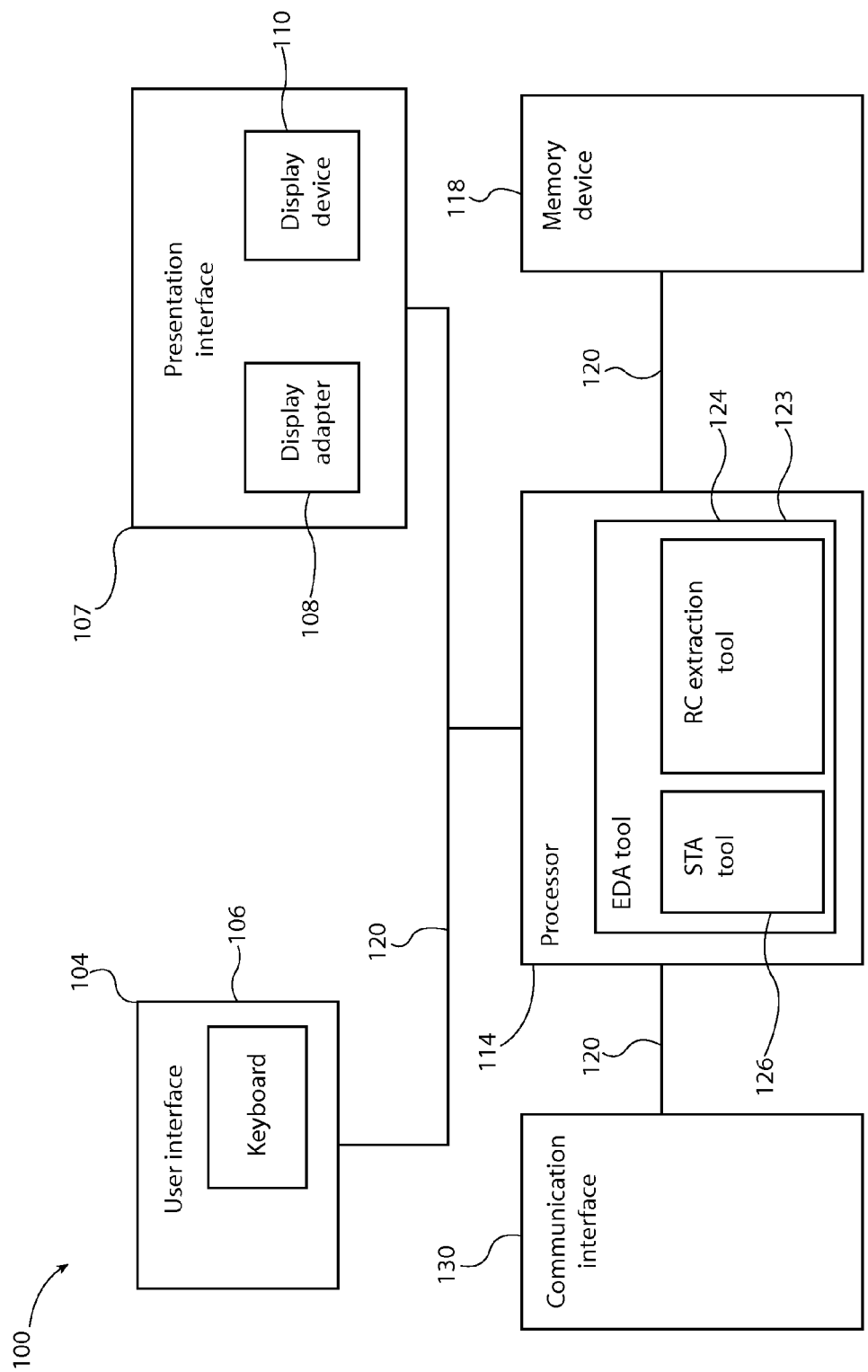
FIG. 2 is a block diagram of one example of a system for modeling the IC, in accordance with some embodiments.

FIG. 2 illustrates a system 100 that is used to design 3D IC 10 (shown in FIG. 1) and to make various determinations regarding 3D IC 10, such as the resistance-capacitance couplings between each tier 12-1, 12-2, 12-3, and 12-4 (shown in FIG. 1) of the design of 3D IC 10. System 100 can include a computer (e.g., desktop, laptop, tablet or mobile device) system or host that includes a user interface 104 that receives at least one input from a user, such as a designer of 3D IC 10. In some embodiments, user interface 104 includes a keyboard 106 that enables the user to input pertinent information. Alternatively, user interface 104 can include, for example, a pointing device, a mouse, a stylus, a touch sensitive panel (e.g., a touch pad or a touch screen), a gyroscope, an accelerometer, a position detector, and/or an audio input interface (e.g., including a microphone).

In some embodiments, system 100 includes a presentation interface 107 that presents information, such as input events and/or validation results, to the user. For example, presentation interface 107 includes a display adapter 108 that is coupled to at least one display device 110. Display device 110 can be a visual display device, such as a cathode ray tube ("CRT"), a liquid crystal display ("LCD"), an organic LED ("OLED") display, and/or an "electronic ink" display. Alternatively, presentation interface 107 can include an audio output device (e.g., an audio adapter and/or a speaker) and/or a printer.

System 100 also includes a central processor 114 and at least one non-transitory, computer readable storage medium, such as a memory device 118. Processor 114 can be coupled to user interface 104, presentation interface 107, and to memory device 118 via a system bus 120. In some embodiments, processor 114 communicates with the user, such as by prompting the user via presentation interface 107 and/or by receiving user inputs via user interface 104. In some embodiments, the processor 114 communicates with the user interface 104 by a wireless interface, such as a personal area network interface (e.g., "Bluetooth").

In some embodiments, processor 114 is programmed by encoding an operation using one or more executable instructions and by providing the executable instructions in memory device 118. The term "processor" refers generally to any programmable system including systems and microcontrollers, reduced instruction set circuits ("RISC"), application specific integrated circuits ("ASIC"), programmable logic circuits ("PLC"), and any other circuit or processor capable of executing the functions described herein. This description is not intended to limit in any way by the definition and/or meaning of the term "processor."

In some embodiments, memory device 118 includes one or more devices that enable information, such as executable instructions and/or other data, to be stored and retrieved. Moreover, in some embodiments, memory device 118 includes one or more computer readable media, such as, without limitation, dynamic random access memory ("DRAM"), static random access memory ("SRAM"), a solid state disk (e.g., an electrically eraseable programmable read only memory (EEPROM) or a flash memory), an optical disk drive and/or a hard disk drive (HDD). In some embodiments, memory device 118 stores, without limitation, application source code, application object code, configuration data, additional input events, application states, assertion statements, validation results, and/or any other type of data.

Processor 114 includes an electronic design automation ("EDA") tool 123. An RC extraction tool 124 and a static timing analysis (STA) tool 126 are each included within EDA tool 123. As explained in more detail below, with respect to the remaining figures, EDA tool 123 and RC extraction tool 124 each include one or more software modules that are executed within processor 114 to facilitate the processes described herein. For example, in some embodiments, as explained in more detail with respect to the remaining figures, EDA tool 123 includes module(s) (not shown) that facilitate the separation of the tiers and is used for a layout versus schematic ("LVS") check. In one embodiment, EDA tool 123 can include software, such as "IC COMPILER"™, sold by Synopsis, Inc. of Mountain View, Calif., which can include a place and route tool (not shown), such as "ZROUTE"™, also sold by Synopsys, Inc. Other EDA tools 123 can be used, such as the "VIRTUOSO" custom design platform (not shown) or the Cadence "ENCOUNTER" ® digital IC design platform (not shown), along with the "VIRTUOSO" chip assembly router (not shown), all sold by Cadence Design Systems, Inc. of San Jose, Calif.

System 100 also includes a communication interface 130 (e.g., IEEE 802.11 or Bluetooth) that is coupled to processor 114 via system bus 120. Moreover, communication interface 130 can be coupled to, for example, a remote terminal (not shown), such as a desktop computer, laptop, mobile device, thin client, or other device. As such, the remote terminal can be capable of displaying applications running inside system 100 to an end user using the remote terminal.

Figure 3:
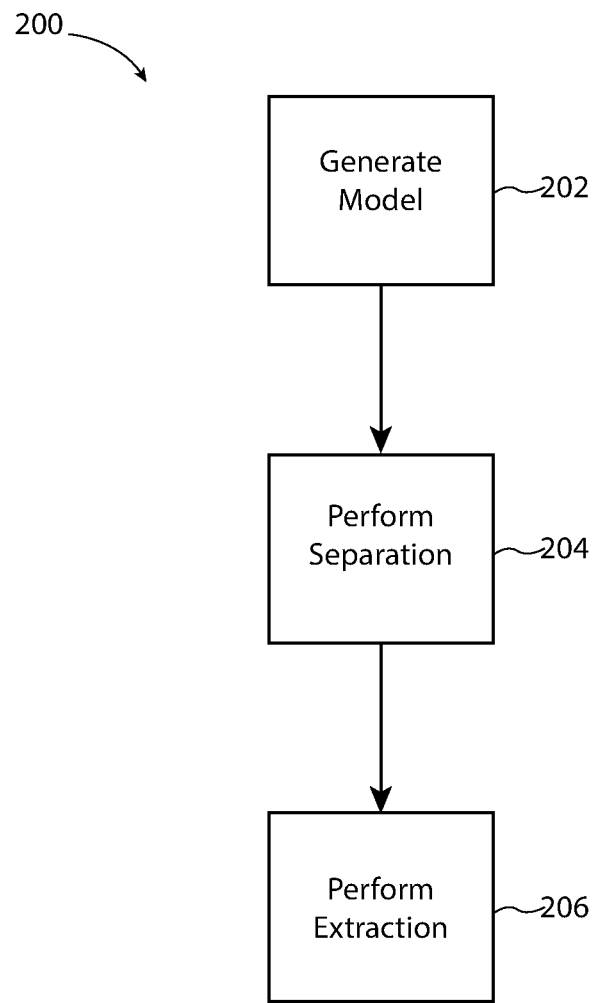
FIG. 3 is a flow diagram of a method for verifying a design of the IC having a tier separation part and an extraction part, in accordance with some embodiments.

FIG. 3 is a flow diagram 200 of a method for verifying a design of an IC having multiple tiers, such as the design of 3D IC 10 (shown in FIG. 1) using system 100 (shown in FIG. 2). In step 202, a model (not shown), such as a network model, of 3D IC 10 is generated, wherein the model is representative of the tiers or layers of 3D IC 10, such as tiers 12-1, 12-2, 12-3, and 12-4 (shown in FIG. 1), including any connections therebetween, such as TSVs 14 (shown in FIG. 1). In step 204, a tier separation is performed by EDA tool 123 (shown in FIG. 2) to separate the devices, such as the transistor devices, of the different tiers and to generate a database for the connections between the different devices. As explained in detail below with respect to the remaining figures, various methods can be performed by EDA tool 123 for the tier separation. After the tier separation, as explained below, an extraction is performed in step 206 for each of the adjacent tier couplings between the devices. As explained below, various types of couplings can be considered when performing the extraction. Accordingly, by using this approach, the resistance-capacitance couplings between each tier 12-1, 12-2, 12-3, and 12-4 can be determined for the design of 3D IC 10.

Figure 4A:
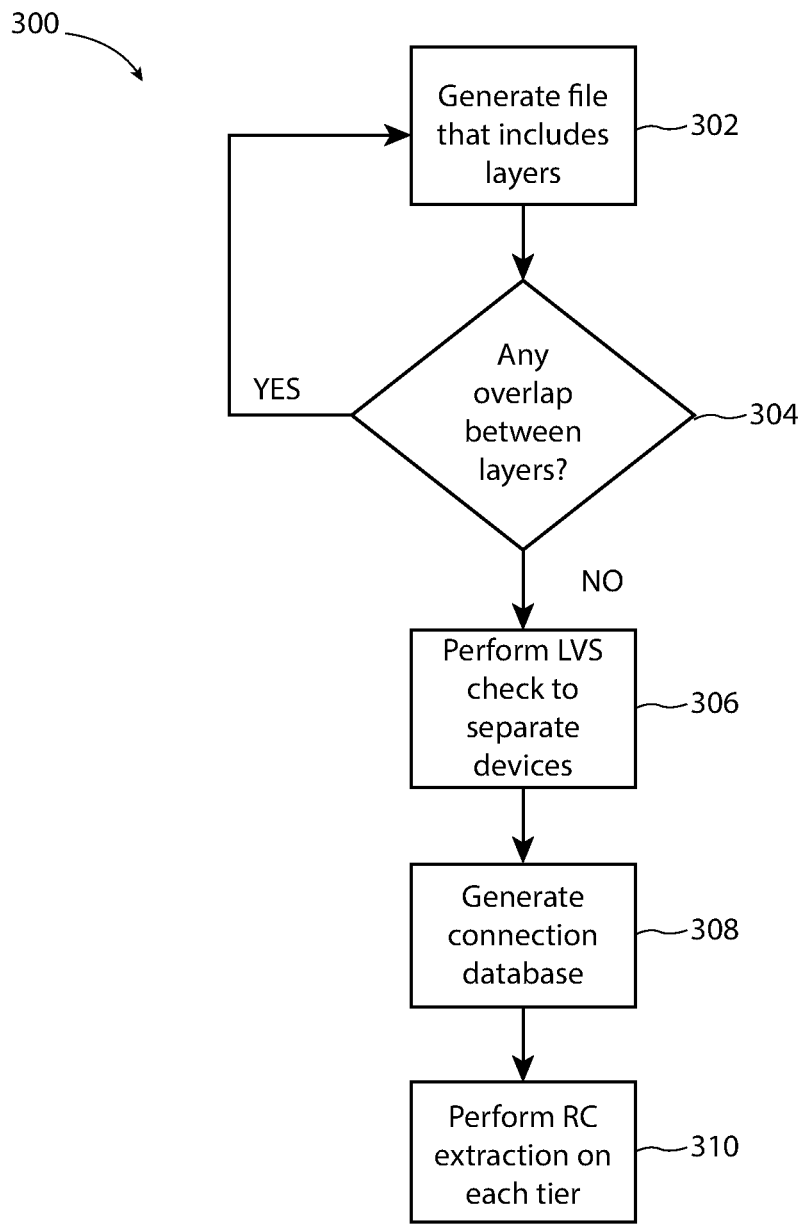
FIG. 4A is a flow diagram of a method for the tier separation part of the method shown in FIG. 3, in accordance with some embodiments.
Figure 4B:
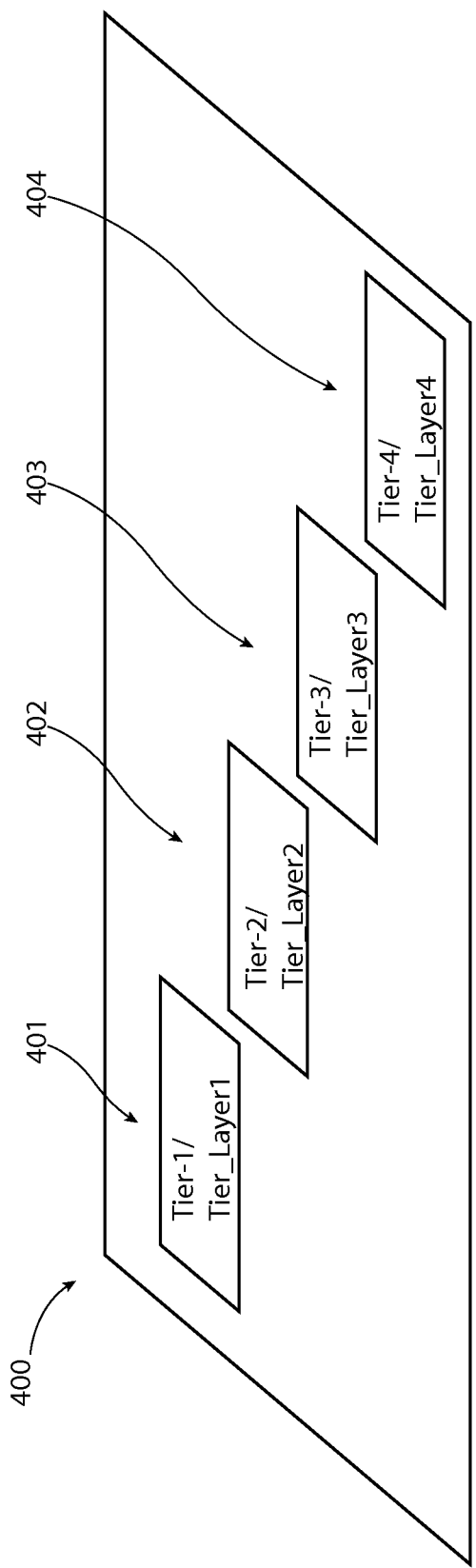
FIG. 4B is a block diagram of one example of a plurality of design layouts that are used for the method shown in FIG. 4A, in accordance with some embodiments.

FIG. 4A is a flow diagram 300 of an exemplary method of performing the tier separation of step 204 (shown in FIG. 3). In step 302, a file, such as a GDS II file, is generated, wherein the file includes a plurality of design layouts and each design layout corresponds to a different tier and includes a different layer for the corresponding tier. In some embodiments, the file can be generated by EDA tool 123 (shown in FIG. 2) or generated by another component and received by EDA tool 123, in which case EDA tool 123 provides the file. FIG. 4B illustrates a block diagram of exemplary design layouts 400, wherein each design layout corresponds to a different tier of 3D IC 10 (shown in FIG. 1) and includes a different layer for the respective tier. In some embodiments, for example, first design layout 401 corresponds to tier 12-1 ("Tier-1") and includes Tier Layer 1, second design layout 402 corresponds to tier 12-2 ("Tier-2") and includes Tier Layer 2, third design layout 403 corresponds to tier 12-3 ("Tier-3") and includes Tier Layer 3, and fourth design layout 404 corresponds to tier 12-4 ("Tier-4") and includes Tier Layer 4. Referring to FIG. 4A, in some embodiments, when generating the file in step 302, EDA tool 123 uses an algorithm that considers each tier, such as "Draw Tier layer1 on the Tier1 design; Draw Tier layer2 on the Tier2 design . . . . " In some embodiments, each design layout includes one or more active devices, such as transistor devices (NMOS or PMOS) that are located on corresponding tiers 12-1, 12-2, 12-3, and 12-4.

In step 304, a design rule check (DRC) is performed to identify if there is any overlap between the layers, such as Tier Layer 1, Tier Layer 2, Tier Layer 3, and Tier Layer 4. For example, in some embodiments, an overlap can refer to a line or a portion of a line in tier N+1 that directly overlies a line or a portion of a line in tier N. In some embodiments, an overlap can refer to a perpendicular line in tier N+1 that crosses a line in tier N, for example. In some embodiments, any polygons in different tiers should not be overlapped. If there is any overlap, then step 302 is repeated and the file is regenerated with different design layouts such that overlap between the layers can be avoided. If there is no overlap, then in step 306, a layout versus schematic (LVS) check is performed to separate the devices, such as transistor devices, of each of the design layouts based on at least one parameter of the corresponding tier or the file. For example, the separation can be based on the layers, such as Tier Layer 1, Tier Layer 2, Tier Layer 3, and Tier Layer 4. In some embodiments, the layers within each tier refers to the metal layers M1, M2, etc, and there is only one device layer per tier. The method separates devices by different tier layers. For example, in some embodiments, the method separates the devices according to the metal layer through which they are interconnected to another device. In some embodiments, when performing the LVS check, EDA tool 123 uses an algorithm that considers each tier, such as "Tier1 pch1 and Tier layer1=pch1_tier 1; Tier2 pch1 and Tier layer 2=pch1_tier2 . . . . "

In step 308, a connection database is generated for each of the different devices in each of the tiers by using the LVS check. For the connection database, in some embodiments, a plurality of adjacent tier connections are generated between one of the plurality of devices in respectively different tiers from each other. In some embodiments, the connection database includes a plurality of adjacent tier couplings between the transistor devices. For example, the connection database can include a coupling between a device in tier 12-1 and a device in tier 12-2.

In step 310, an RC extraction is performed for each of the tiers 12-1, 12-2, 12-3, and 12-4 to create a database that includes each of the devices that have been separated by the corresponding design layout. For example, the RC extraction is performed for each of the tiers to compute couplings between each of the devices of the corresponding design layout.

Figure 5A:
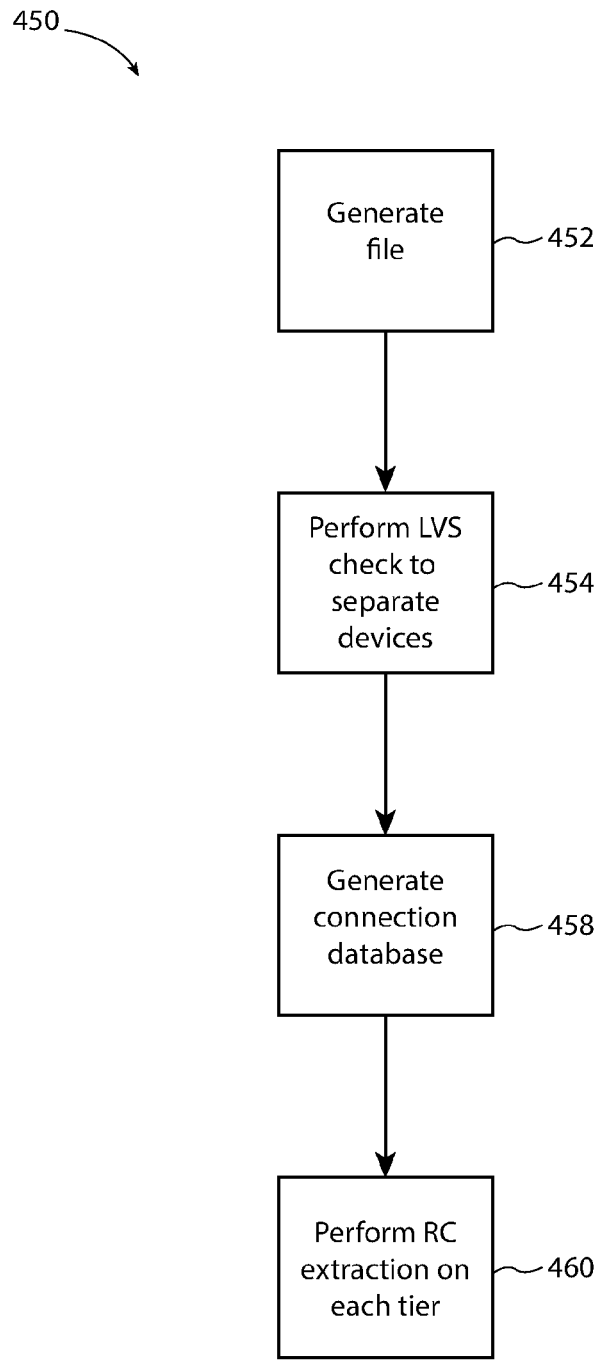
FIG. 5A is a flow diagram of an alternative method for the tier separation part of the method shown in FIG. 3, in accordance with some embodiments.
Figure 5B:
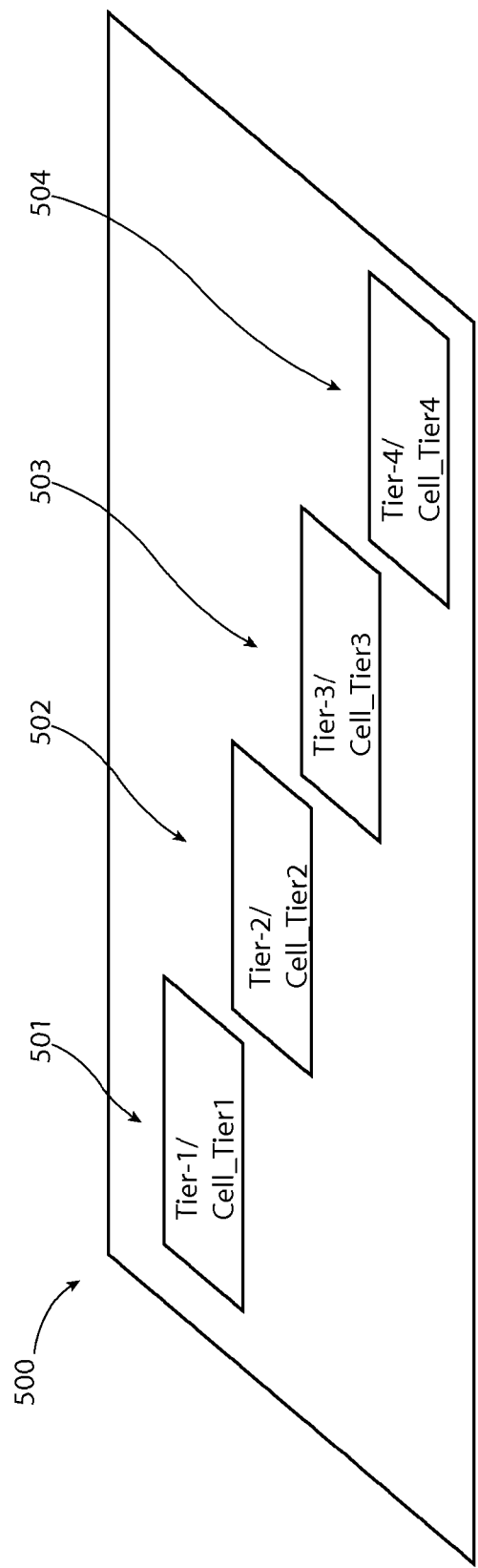
FIG. 5B is a block diagram of one example of a plurality of design layouts that are used for the method shown in FIG. 5A, in accordance with some embodiments.

FIG. 5A is a flow diagram 450 of an alternative method of performing the tier separation of step 204 (shown in FIG. 3) in place of the method shown in FIG. 4A. In step 452, a file, such as a GDS II file, is generated, wherein the file includes a plurality of design layouts and each design layout corresponds to a different cell of the different tiers. In some embodiments, each cell can include a portion of the corresponding tier where a device is located. FIG. 5B illustrates a block diagram of exemplary design layouts 500. In some embodiments, for example, first design layout 501 corresponds to tier 12-1 ("Tier-1") and includes Cell Tier 1, second design layout 502 corresponds to tier 12-2 ("Tier-2") and includes Cell Tier 2, third design layout 503 corresponds to tier 12-3 ("Tier-3") and includes Cell Tier 3, and fourth design layout 504 corresponds to tier 12-4 ("Tier-4") and includes Cell Tier 4. Referring to FIG. 5A, in some embodiments, when generating the file in step 452, EDA tool 123 (shown in FIG. 2) uses an algorithm that considers each tier, such as "Draw Tier1 design in Cell_Tier1; Draw Tier 2 design in Cell_Tier2 . . . . " In some embodiments, each design layout includes one or more devices, such as transistor devices (NMOS or PMOS) that are located on corresponding tiers 12-1, 12-2, 12-3, and 12-4.

In step 454, an LVS check is performed to separate the devices of each one of the design layouts from the devices of other design layouts based on at least one parameter of the corresponding tier or the file. For example, the separation can be based on the tier cells, such as Cell Tier 1, Cell Tier 2, Cell Tier 3, and Cell Tier 4. In some embodiments, when performing the LVS check, EDA tool 123 uses an algorithm that considers each tier, such as "Tier1 pch1 in Cell_Tier1=pch1_tier1; Tier2 pch1 in Cell_Tier2=pch1_tier2 . . . ."

In step 458, a connection database is generated for each of the different devices in each of the tiers by using the LVS check. For the connection database, in some embodiments, a plurality of adjacent tier connections are generated between one of the plurality of devices in respectively different tiers from each other. In some embodiments, the connection database includes a plurality of adjacent tier couplings between the devices. For example, the connection database can include a coupling between a device in tier 12-1 and a device in tier 12-2.

In step 460, an RC extraction is performed for each of the tiers 12-1, 12-2, 12-3, and 12-4 to create a database that includes each of the devices of the corresponding design layout that have been separated. For example, the RC extraction is performed for each of the tiers to compute couplings between each of the devices of the corresponding design layout.

Figure 6A:
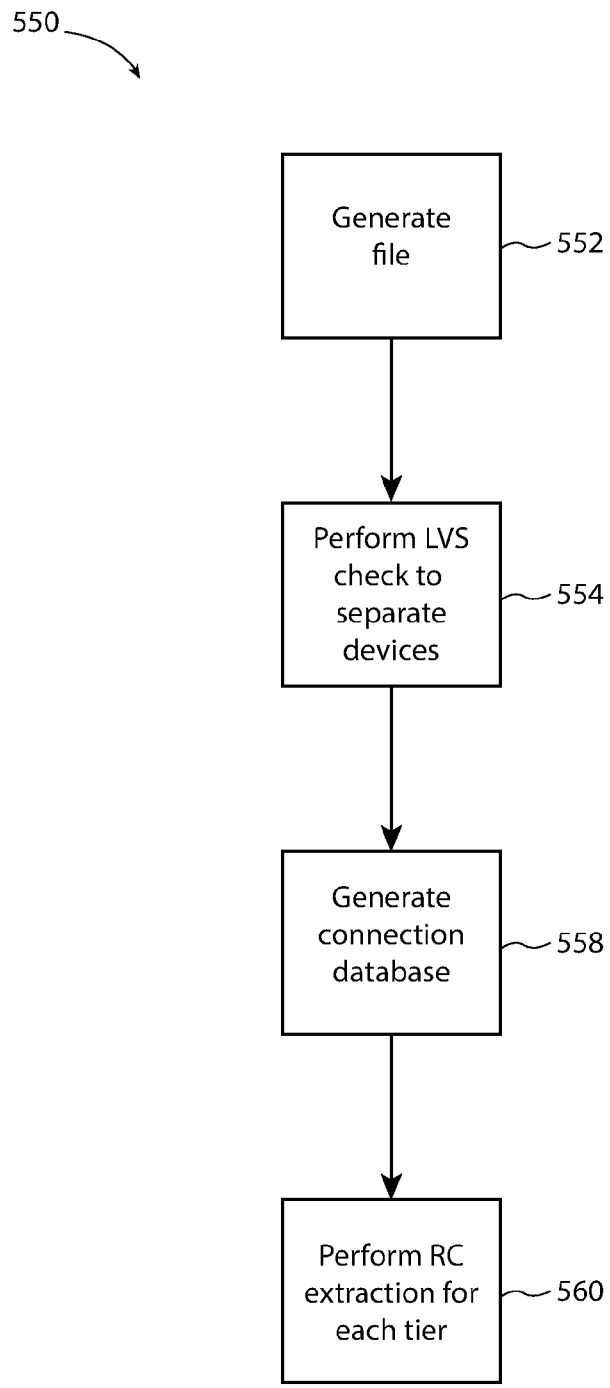
FIG. 6A is a flow diagram of an another alternative method for the tier separation part of the method shown in FIG. 3, in accordance with some embodiments.
Figure 6B:
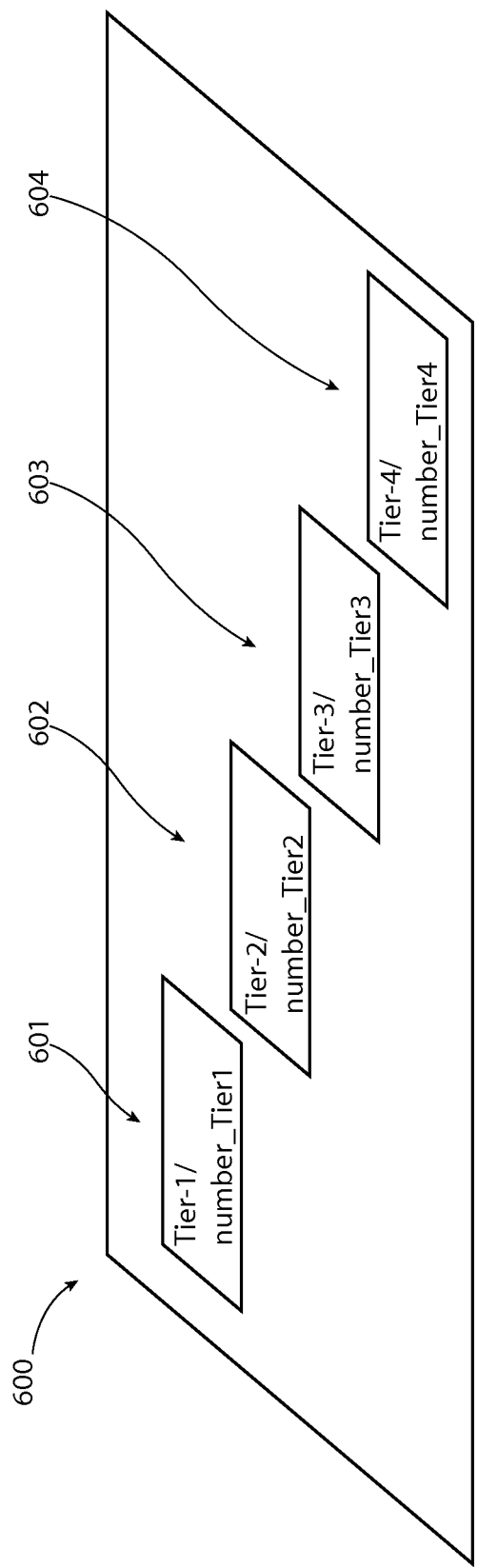
FIG. 6B is a block diagram of one example of a plurality of design layouts that are used for the method shown in FIG. 6A, in accordance with some embodiments.

FIG. 6A is a flow diagram 550 of an alternative method of performing the tier separation of step 204 (shown in FIG. 3) in place of the methods shown in FIG. 4A or FIG. 5A. In step 552, a file, such as a GDS II file, is generated, wherein the file includes a plurality of design layouts, wherein each design layout corresponds to a different tier and to a different layer number of the corresponding tier. In some embodiments, each layer number can include a different GDS number and a different datatype for each tier. For example, objects contained in a GDS II file are grouped by assigning numeric attributes to them, including a layer number, datatype, or texttype. For example, one layer number can have 255 datatype, such as 16;30 (layer number 16 and datatype 30). Moreover, in some embodiments, each different design layout can be defined in a different datatype, such as tier 12-1 in 16;1 and tier 12-2 in 16;2. FIG. 6B illustrates a block diagram of exemplary design layouts 600. In some embodiments, for example, first design layout 601 corresponds to tier 12-1 ("Tier-1") and includes number Tier 1, second design layout 602 corresponds to tier 12-2 ("Tier-2") and includes number Tier 2, third design layout 603 corresponds to tier 12-3 ("Tier-3") and includes number Tier 3, and fourth design layout 604 corresponds to tier 12-4 ("Tier-4") and includes number Tier 4.

Referring to FIG. 6A, in some embodiments, when generating the file in step 552, EDA tool 123 (shown in FIG. 2) uses an algorithm that considers each tier, such as "Draw Tier1 design in layer number_Tier1; Draw Tier 2 design in layer number_Tier2 . . . ." In some embodiments, each design layout includes one or more devices, such as transistor devices (NMOS or PMOS) that are located on corresponding tiers 12-1, 12-2, 12-3, and 12-4.

In step 554, a LVS check is performed on the devices of each of the design layouts to separate the devices based on at least one parameter of the corresponding tier or the file. For example, the separation can be based on the layer number, such as the GDS number, and datatype. In some embodiments, when performing the LVS check, EDA 123 uses an algorithm that considers each tier, such as "Tier1 pch1 in 17;101=pch1_tier1; Tier2 pch1 in 17;102=pch1_tier2 . . . ."

In step 558, a connection database is generated for each of the different devices in each of the tiers by using the LVS check. For the connection database, in some embodiments, a plurality of adjacent tier connections are generated between one of the plurality of devices in respectively different tiers from each other. In some embodiments, the connection database includes a plurality of adjacent tier couplings between the devices. For example, the connection database can include a coupling between a device in tier 12-1 and a device in tier 12-2.

In step 560, an RC extraction is performed for each of the tiers 12-1, 12-2, 12-3, and 12-4 to create a database that includes each of the devices of the corresponding design layout that have been separated. For example, the RC extraction is performed for each of the tiers to compute couplings between each of the devices of the corresponding design layout.

Figure 7A:
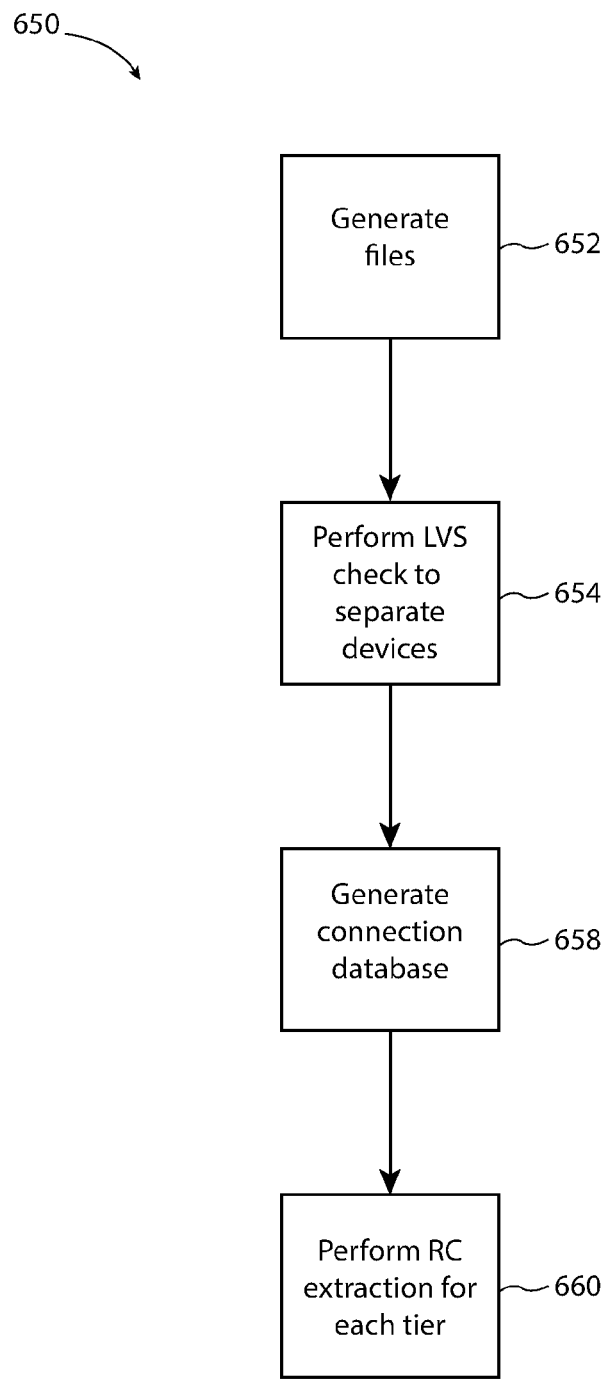
FIG. 7A is a flow diagram of another alternative method for the tier separation part of the method shown in FIG. 3, in accordance with some embodiments.
Figure 7B:
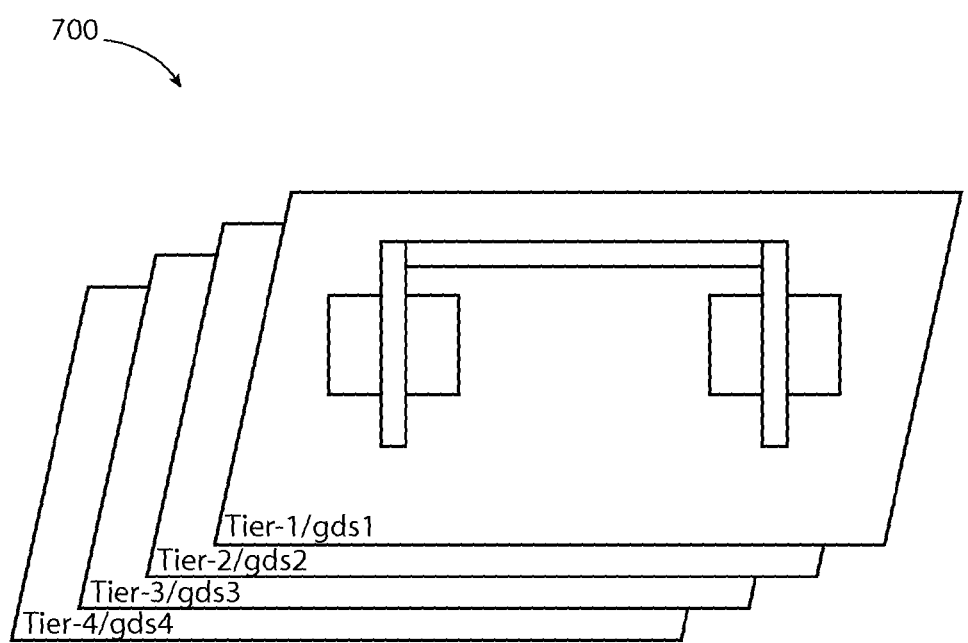
FIG. 7B is a block diagram of one example of a plurality of design layouts that are used for the method shown in FIG. 7A, in accordance with some embodiments.

FIG. 7A is a flow diagram 650 of an alternative method of performing the tier separation of step 204 (shown in FIG. 3) in place of the methods shown in FIG. 4A, FIG. 5A, or FIG. 6A. In step 652, a plurality of files are generated such that each file corresponds to a different tier, wherein each file includes a design layout for the corresponding tier. FIG. 7B illustrates a schematic diagram of GDS II files 700 having design layouts. In some embodiments, for example, gds 1 corresponds to tier 12-1 ("Tier-1"), gds 2 corresponds to tier 12-2 ("Tier-2"), gds 3 (not shown) corresponds to tier 12-3 ("Tier-3"), and gds 4 (not shown) corresponds to tier 12-4 ("Tier-4"). Referring to FIG. 7A, in some embodiments, when generating the files in step 652, EDA tool 123 (shown in FIG. 2) uses an algorithm that considers each tier, such as "Draw Tier1 design in Tier1 gds; Draw Tier 2 design in Tier 2 gds . . . ." In some embodiments, each design layout includes one or more devices, such as transistor devices (NMOS or PMOS), that are located on corresponding tiers 12-1, 12-2, 12-3, and 12-4.

In step 654, a LVS check is performed to separate the devices of each of the design layouts based on at least one parameter of the corresponding tier or the files. For example, in some embodiments, the separation is based on which GDS II file contains each respective device. In some embodiments, when performing the LVS check, EDA 123 uses an algorithm that considers each tier, such as "Tier1 pch1 in Tier1 gds=pch1_tier1; Tier2 pch1 in Tier2 gds=pch1_tier2 . . . ."

In step 658, a connection database is generated for each of the different devices in each of the tiers by using the LVS check. For the connection database, in some embodiments, a plurality of adjacent tier connections are generated between one of the plurality of devices in respectively different tiers from each other. In some embodiments, the connection database includes a plurality of adjacent tier couplings between the devices. For example, the connection database can include a coupling between a device in tier 12-1 and a device in tier 12-2.

In step 660, an RC extraction is performed for each of the tiers 12-1, 12-2, 12-3, and 12-4 to create a database that includes each of the devices of the corresponding design layout that have been separated. For example, the RC extraction is performed for each of the tiers to compute couplings between each of the devices of the corresponding design layout.

Figure 8A:
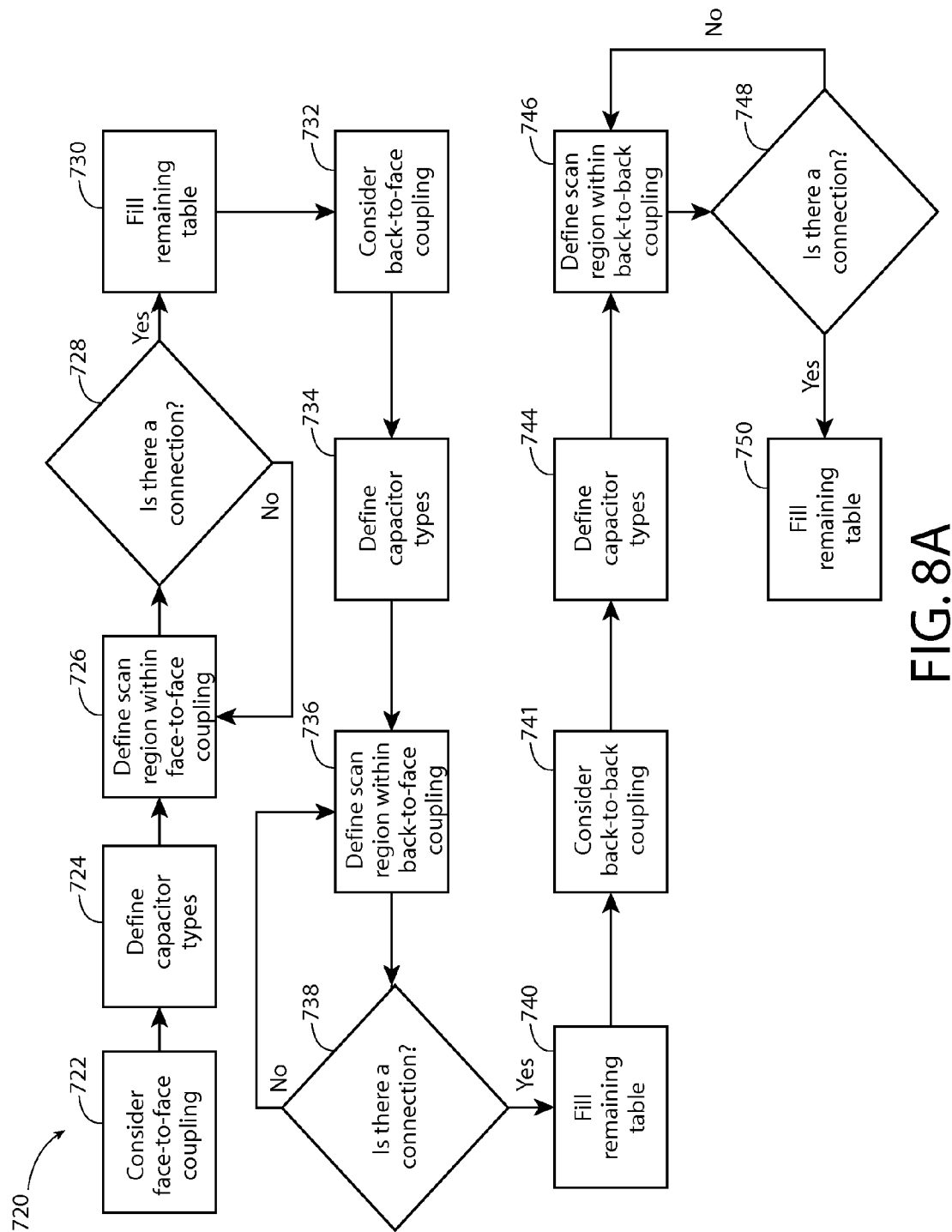
FIG. 8A is a flow diagram of a method for the extraction part of the method shown in FIG. 3, in accordance with some embodiments.
Figure 8B:
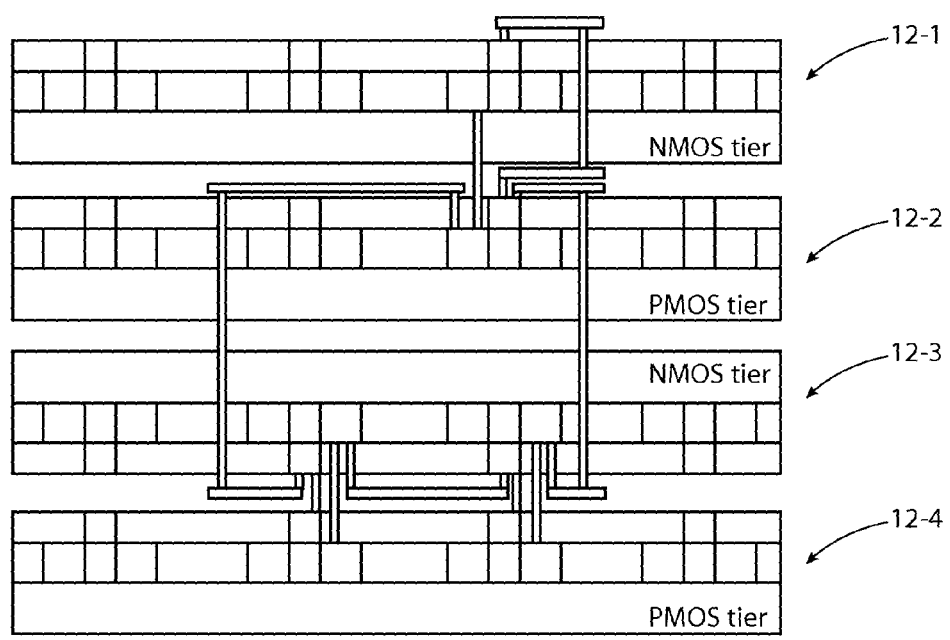
FIGS. 8B-8E are each block diagrams of the types of couplings that are considered for the method shown in FIG. 8A, in accordance with some embodiments.
Figure 8C:
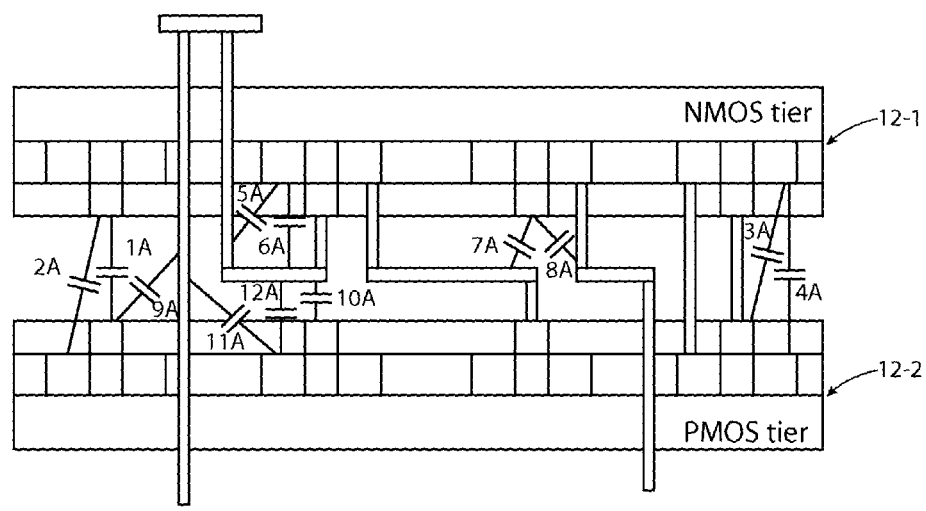

As illustrated in FIG. 3, after the tier separation, an extraction is performed, in step 206, for each of the adjacent tier couplings between the devices. For example, after an RC extraction is performed for each of the tiers 12-1, 12-2, 12-3, and 12-4 (shown in FIG. 4A, 5A, 6A, or 7A), another RC extraction is performed for each of the adjacent tier couplings (i.e., "tier-to-tier coupling" extraction). The RC extraction, for example, can be performed for the coupling between the devices that are located on one tier, such as tier 12-1, and the devices that are located on an adjacent, such as tier 12-2. FIG. 8A is a flow diagram 720 of an exemplary method of performing the extraction of step 206 (shown in FIG. 3). In step 722, a coupling, such as a face-to-face coupling is considered. For example, FIG. 8B illustrates the tier couplings between tiers 12-1, 12-2, 12-3, and 12-4, wherein each tier is either an NMOS tier or a PMOS tier. FIG. 8C illustrates a face-to-face coupling between the face of tier 12-1 (NMOS tier) and the face of tier 12-2 (PMOS tier). As shown in FIG. 8C, in some embodiments, twelve paired devices are considered, such as (1A), (2A), (3A), (4A), (5A), (6A), (7A), (8A), (9A), (10A), (11A), and (12A).

Referring to FIG. 8A, for the paired or coupled devices, capacitor types are defined in step 724. In some embodiments, a table can be used to fill up the various capacitance. For example, as shown FIG. 8C and in Table 1 below, twelve new capacitor types can be defined based on the different NMOS tier and PMOS tier pairings or couplings between tier 12-1 and tier 12-2. In some embodiments, Table 1 includes each of the capacitor types (1A through 12A) that can be defined based on the couplings between the various devices on the tiers (shown in FIG. 8C). For example, in Table 1, capacitor type 1A is based on a coupling between a device on one of the layers on the NMOS tier and a device on one of the layers on the PMOS tier, wherein the layer types (PO) are the same on each of the respective tiers (shown in FIG. 8C). Similarly, capacitor type 2A is based on a coupling between a device on one of the layers on the NMOS tier and a device on one of the layers on the PMOS tier (shown in FIG. 8C). However, capacitor type 2A is based on a coupling wherein the layer types are different (PO and OD) on each of the respective tiers (shown in FIG. 8C). Included in Table 1 are also couplings between a device and a layer or a via. For example, capacitor type 6A is based on a coupling between a device on the NMOS tier in one layer (OD) and a metal layer (M0) (shown in FIG. 8C). Capacitor type 5A is based on a coupling between a device on the NMOS tier in one layer (OD) and a via (TSV) (shown in FIG. 8C).

TABLE 1

Twelve new capacitor types based on the pairings in FIG. 8C

1A) N_PO <-> P_PO
2A) N_PO <-> P_OD
3A) P_PO <-> N_OD
4A) P_OD <-> N_OD
5A) N_OD <-> TSV
6A) N_OD <-> M0
7A) N_PO <-> M0
8A) N_PO <-> TSV
9A) P_PO <-> TSV
10A) P_PO <-> M0
11A) P_OD <-> TSV
12A) P_OD <-> M0

In some embodiments, capacitor types 1A through 4A initially exist in the paired respective NMOS and PMOS tiers (tier 12-1 and tier 12-2, respectively). They are automatically filled in the table based on the respective design layouts for the tiers. Referring to FIG. 8A, in step 726, a scan region is defined for RC extraction tool 124 (shown in FIG. 2) within the face-to-face coupling. In step 728, in the scan region, a determination is made as to whether a target device on one tier has a connection with a neighboring device on an adjacent tier. In some embodiments, this coupling can be a type of metal (M0) and a type of via (TSV) coupling in the region. In some embodiments, TSV cannot pass through a channel (not shown). If a connection is determined, then the remaining table can be filled in step 730. For example, referring to Table 1 and FIG. 8C, 5A through 12A can be filled. If no connection is determined, then step 726 is repeated and another scan region is defined within the face-to-face coupling.

Figure 8D:
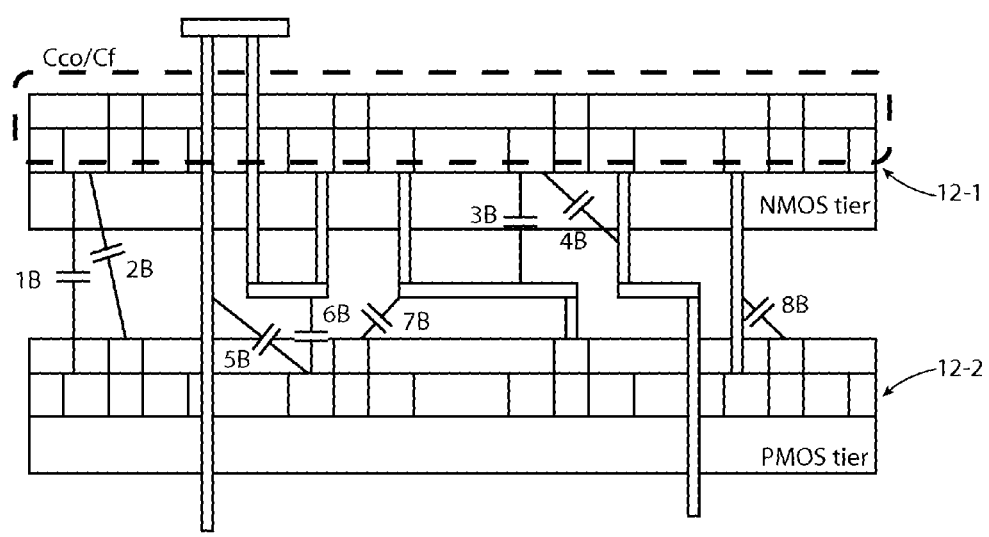

Referring to FIG. 8A, in step 732, a back-to-face coupling is considered next. For example, FIG. 8D illustrates a back-to-face coupling between the back of tier 12-1 (NMOS tier) and the face of tier 12-2 (PMOS tier). As shown in FIG. 8D, in some embodiments, eight paired devices are considered, such as (1B), (2B), (3B), (4B), (5B), (6B), (7B), and (8B).

Referring to FIG. 8A, for the paired or coupled devices, capacitor types are defined in step 734. In some embodiments, a table can be used to fill up the various capacitance. For example, as shown FIG. 8D and in Table 2 below, eight new capacitor types can be defined based on the different NMOS tier and PMOS tier pairings or couplings within the back-to-face coupling between tier 12-1 and tier 12-2. In some embodiments, Table 2 includes each of the capacitor types (1B through 8B) that can be defined based on the couplings between the various devices on the tiers (shown in FIG. 8D). For example, in Table 2, capacitor type 1B is based on a coupling between a device on one of the layers on the NMOS tier and a device on one of the layers on the PMOS tier, wherein the layer types (PO) are the same on each of the respective tiers (shown in FIG. 8D). Similarly, capacitor type 2B is based on a coupling between a device on one of the layers on the NMOS tier and a device on one of the layers on the PMOS tier (shown in FIG. 8D). However, capacitor type 2B is based on a coupling wherein the layer types are different (PO and OD) on each of the respective tiers (shown in FIG. 8C). Included in Table 2 are also couplings between a device and a layer or a via. For example, capacitor type 6B is based on a coupling between a device on the PMOS tier in one layer (OD) and a metal layer (M0) (shown in FIG. 8D). Capacitor type 5B is based on a coupling between a device on the PMOS tier in one layer (OD) and a via (TSV) (shown in FIG. 8D).

TABLE 2

Eight new capacitor types based on the pairings in FIG. 8D

1B) N_OD <-> P_OD
2B) N_OD <-> P_PO
3B) N_OD <-> M0
4B) N_OD <-> TSV
5B) P_OD <-> TSV
6B) P_OD <-> M0
7B) P_PO <-> M0
8B) P_PO <-> TSV

In some embodiments, capacitor types 1B and 2B initially exist in the paired respective NMOS and PMOS tiers (tier 12-1 and tier 12-2, respectively). They are automatically filled in the table based on the respective design layouts for the tiers. Referring to FIG. 8A, in step 736, a scan region is defined for RC extraction tool 124 within the back-to-face coupling. In step 738, in the scan region, a determination is made as to whether a target device on one tier has a connection with a neighboring device on the adjacent tier. In some embodiments, this coupling can be a type of metal (M0) and a type of via (TSV) coupling in the region. In some embodiments, TSV cannot pass through a channel (not shown). If a connection is determined, then the remaining table can be filled in step 740. For example, referring to Table 2 and FIG. 8D, 3B through 8B can be filled. If no connection is determined, then step 736 is repeated and another scan region is defined.

Referring to FIG. 8A, in step 741, a back-to-back coupling is considered next. For example, FIG. 8E illustrates a back-to-back coupling between the back of tier 12-1 (NMOS tier)

and the back of tier 12-2 (PMOS tier). As shown in FIG. 8E, in some embodiments, five paired devices are considered, such as (1C), (2C), (3C), (4C), and (5C). Referring to FIG. 8A, for the paired or coupled devices, capacitor types are defined in step 744. In some embodiments, a table can be used to fill up the various capacitance. For example, as shown FIG. 8E and in Table 3 below, five new capacitor types can be defined based on the different NMOS tier and PMOS tier pairings or couplings within the back-to-back coupling of tier 12-1 and tier 12-2. In some embodiments, Table 3 includes each of the capacitor types (1C through 5C) that can be defined based on the couplings between the various devices on the tiers (shown in FIG. 8E). For example, in Table 3, capacitor type 1C is based on a coupling between a device on one of the layers on the NMOS tier and a device on one of the layers on the PMOS tier, wherein the layer types (OD) are the same on each of the respective tiers (shown in FIG. 8E). Included in Table 3 are also couplings between a device and a layer or a via. For example, capacitor type 3C is based on a coupling between a device on the NMOS tier in one layer (OD) and a metal layer (M0) (shown in FIG. 8E). Capacitor type 2C is based on a coupling between a device on the NMOS tier in one layer (OD) and a via (TSV) (shown in FIG. 8E).

TABLE 3

Figure 8E:
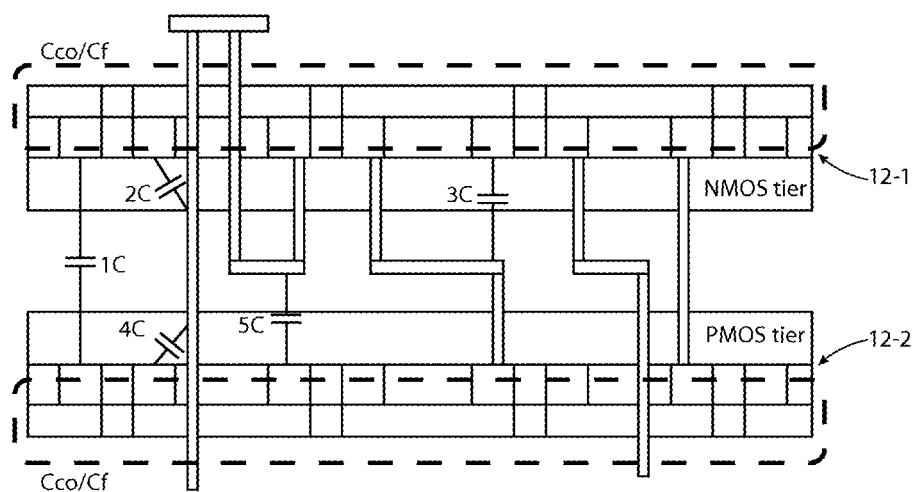

Five new capacitor types based on the pairings in FIG. 8E

1C) N_OD <-> P_OD
2C) N_OD <-> TSV
3C) N_OD <-> M0
4C) P_OD <-> TSV
5C) P_OD <-> M0

In some embodiments, capacitor type 1C initially exists in the paired respective NMOS and PMOS tiers. It is automatically filled in the table based on the respective design layouts for the tiers. Referring to FIG. 8A, in step 746, a scan region is defined for RC extraction tool 124 within the back-to-back coupling. In step 748, in the scan region, a determination is made as to whether a target device on one tier has a connection with a neighboring device on an adjacent tier. In some embodiments, this coupling can be a type of metal (M0) and a type of via (TSV) coupling in the region. In some embodiments, TSV cannot pass through a channel (not shown). If a connection is determined, then the remaining table can be filled in step 750. For example, referring to Table 3 and FIG. 8E, 3C through 5C can be filled. If no connection is determined, then step 746 is repeated and another scan region is defined.

While FIG. 8A shows the face-to-face coupling being considered first, the different types of couplings can be considered in any order or simultaneously so long as each of the different types of couplings are considered. In some embodiments, not all of the different types of couplings are present in the 3D IC, in which case the particular coupling type is not considered. For example, in some embodiments, there may only be face-to-face couplings and back-to-back couplings, in which case, the back-to-face coupling will not be considered.

As compared to other techniques used to verify the design of an IC having multiple tiers, such as a 3D IC, the embodiments of the method and system described herein facilitate a technique such that resistance-capacitance couplings can be assessed for the area between the tiers. In some embodiments, design layouts can be used to separate the tiers and the devices, such as transistor devices, within the tiers. This separation can then facilitate a determination as to the couplings between the devices that are positioned on separate and adjacent tiers (i.e., adjacent tier couplings or tier-to-tier couplings). A first RC extraction can then be performed on each tier to create a database that includes each of the devices that have been separated. A second RC extraction can be performed for the adjacent tier couplings between the devices. Accordingly, some embodiments described herein provide a technique such that resistance-capacitance couplings between each of the tiers can be determined for the design of the IC.

In some embodiments, a method for verifying the design of an IC having a plurality of tiers includes conducting a LVS check to separate a plurality of devices of a plurality of design layouts, wherein each design layout corresponds to a respectively different tier having the respective devices. A plurality of adjacent tier connections are generated between one of the devices in respectively different tiers from each other, using a computing device. A first RC extraction for each of the tiers is performed to compute couplings between each of the plurality of devices of the corresponding design layout. A second RC extraction for each of the adjacent tier connections is performed.

In some embodiments, a system includes a non-transient machine readable storage medium storing a plurality of design layouts that are provided by an EDA tool for an IC having a plurality of tiers, wherein each design layout corresponds to a respectively different tier having a respective plurality of devices. A RC tool is within the EDA tool such that the EDA tool is configured to conduct a LVS check to separate the devices of the design layouts. The EDA tool is also configured to generate a plurality of adjacent tier connections between one of the devices in respectively different tiers from each other and to perform a first RC extraction for each of the tiers to compute couplings between each of the devices of the corresponding design layout. The EDA tool is also configured to perform a second RC extraction for each of the adjacent tier connections.

In some embodiments, at least one non-transitory computer-readable storage medium having computer-executable instructions embodied thereon, wherein, when executed by at least one processor, the computer-executable instructions cause the processor to conduct a LVS check to separate a plurality of devices of a plurality of design layouts for an IC having a plurality of tiers, wherein each design layout corresponds to a respectively different tier having the respective plurality of devices. The computer-executable instructions also cause the processor to generate a plurality of adjacent tier connections between one of the devices in respectively different tiers from each other. The computer-executable instructions also cause the processor to perform a first RC extraction for each of the tiers to compute couplings between each of the devices of the corresponding design layout and to perform a second RC extraction for each of the adjacent tier connections.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for verifying a design of an integrated circuit ("IC") having a plurality of tiers, said method comprising:
conducting a layout versus schematic ("LVS") check to separate a plurality of devices of a plurality of design layouts, wherein each design layout corresponds to a respectively different tier having the respective plurality of devices;
generating a plurality of adjacent tier connections between one of the plurality of devices in respectively different tiers from each other, using a computing device;
performing a first resistance-capacitance ("RC") extraction for each of the plurality of tiers to compute couplings between each of the plurality of devices of the corresponding design layout; and
performing a second RC extraction for each of the adjacent tier connections between a pair of adjacent tiers, wherein the second RC extraction step uses a first table to provide capacitive couplings between tiers if the adjacent tiers are face-to-face tiers and a second table to provide capacitive couplings between tiers if the adjacent tiers are a pair of back-to-face tiers.

2. The method of claim 1, wherein the plurality of design layouts includes a plurality of layers such that each design layout includes a respectively different layer for the corresponding tier.

3. The method of claim 2, further comprising:
performing a design rule check ("DRC") to determine the presence of any overlap between the plurality of layers; and
regenerating the plurality of design layouts if an overlap is present.

4. The method of claim 1, further comprising generating at least one file that includes the plurality of design layouts for a plurality of cells of the plurality of tiers such that each of the plurality of design layouts corresponds to a different cell.

5. The method of claim 1, further comprising generating at least one file that includes the plurality of design layouts for layer data of the plurality of tiers such that each of the plurality of design layouts corresponds to respectively different layer data.

6. The method of claim 5, wherein the layer data includes at least one of a file number or a data type.

7. The method of claim 1, further comprising generating a plurality of files that include the plurality of design layouts such that each of the plurality of files corresponds to a different design layout.

8. The method of claim 1, wherein the first table includes respective couplings between a first node and a second node, wherein the first node is one of the group consisting of an N-gate, a P-gate, an N-source/drain and a P-source/drain, and the second node is one of the group consisting of an P-gate, an N-source/drain, a P-source/drain, a via connecting adjacent tiers, and a conductive line layer that connects two vias connecting adjacent tiers.

9. The method of claim 1, wherein the second table includes respective couplings between a first node and a second node, wherein the first node is one of the group consisting of a P-gate, an N-source/drain and a P-source/drain, and the second node is one of the group consisting of an P-gate, a P-source/drain, a via connecting adjacent tiers, and a conductive line layer that connects two vias connecting adjacent tiers.

10. The method of claim 1, wherein the second RC extraction step uses a third table to provide capacitive couplings to devices between tiers if the adjacent tiers are back-to-back tiers, and the third table includes respective couplings between a first node and a second node, wherein the first node is one of the group consisting of an N-source/drain and a P-source/drain, and the second node is one of the group consisting of an a P-source/drain, a via connecting adjacent tiers, and a conductive line layer that connects two vias connecting adjacent tiers.

11. The method of claim 1, wherein:
the first table includes respective couplings between a first node and a second node, wherein the first node is one of the group consisting of an N-gate, a P-gate, an N-source/drain and a P-source/drain, and the second node is one of the group consisting of an P-gate, an N-source/drain, a P-source/drain, a via connecting adjacent tiers, and a conductive line layer that connects two vias connecting adjacent tiers;
the second table includes respective couplings between a third node and a fourth node, wherein the third node is one of the group consisting of a P-gate, an N-source/drain and a P-source/drain, and the fourth node is one of the group consisting of an P-gate, a P-source/drain, a via connecting adjacent tiers, and a conductive line layer that connects two vias connecting adjacent tiers; and
the third table includes respective couplings between a fifth node and a sixth node, wherein the fifth node is one of the group consisting of an N-source/drain and a P-source/drain, and the sixth node is one of the group consisting of an a P-source/drain, a via connecting adjacent tiers, and a conductive line layer that connects two vias connecting adjacent tiers.

12. A system comprising:
a non-transient machine readable storage medium storing a plurality of design layouts that are provided by an electronic design automation ("EDA") tool for an integrated circuit ("IC") having a plurality of tiers, wherein each design layout corresponds to a respectively different tier having a respective plurality of devices; and
a resistance-capacitance ("RC") tool within the EDA tool such that the EDA tool is configured to:
conduct a layout versus schematic ("LVS") check to separate the plurality of devices of the plurality of design layouts;
generate a plurality of adjacent tier connections between one of the plurality of devices in respectively different tiers from each other, the plurality of tiers including at least two tiers having active device layers;
perform a first resistance-capacitance ("RC") extraction for each of the plurality of tiers to compute couplings between each of the plurality of devices of the corresponding design layout; and
perform a second RC extraction for each of the adjacent tier connections, wherein the second RC extraction step uses at least a table to provide capacitances for devices of a pair of back-to-face tiers, wherein the table includes respective couplings between a first node and a second node, wherein the first node is one of the group consisting of a P-gate, an N-source/drain and a P-source/drain and the second node is one of the group consisting of an P-gate a P-source/drain, a via connecting adjacent tiers, and a conductive line layer that connects two vias connecting adjacent tiers.

13. The system of claim 12, wherein the plurality of design layouts includes a plurality of layers such that each design layout includes a respectively different layer for the corresponding tier.

14. The system of claim 13, wherein the EDA tool is further configured to:

perform a design rule check ("DRC") to determine the presence of any overlap between the plurality of layers; and regenerate the plurality of design layouts if an overlap is present.

15. The system of claim 12, wherein the plurality of design layouts correspond to a plurality of cells of the plurality of tiers such that each of the plurality of design layouts corresponds to a different cell.

16. The system of claim 12, wherein the plurality of design layouts correspond to layer data of the plurality of tiers such that each of the plurality of design layouts corresponds to respectively different layer data.

17. The system of claim 12, wherein the layer data includes at least one of a file number or a data type.

18. At least one non-transitory computer-readable storage medium having computer-executable instructions embodied thereon, wherein, when executed by at least one processor, the computer-executable instructions cause the at least one processor to:

conduct a layout versus schematic ("LVS") check to separate a plurality of devices of a plurality of design layouts for an integrated circuit ("IC") having a plurality of tiers, wherein each design layout corresponds to a respectively different tier having the respective plurality of devices;

generate a plurality of adjacent tier connections between one of the plurality of devices in respectively different tiers from each other;

perform a first resistance-capacitance ("RC") extraction for each of the plurality of tiers to compute couplings between each of the plurality of devices of the corresponding design layout; and performing a second RC extraction for each of the adjacent tier connections, wherein the second RC extraction step uses a first table for couplings to devices in a pair of face-to-face tiers, a second table for couplings to devices in a pair of back-to-face tiers, and a third table for couplings to devices in a pair of back-to-back tiers, the first, second and third tables being used to provide capacitances.

19. The at least one non-transitory computer-readable storage medium of claim 18, wherein the plurality of design layouts includes a plurality of layers such that each design layout includes a respectively different layer for the corresponding tier.

20. The at least one non-transitory computer-readable storage medium of claim 18, wherein the computer-executable instructions further cause the at least one processor to provide a plurality of files that include the plurality of design layouts such that each of the plurality of files corresponds to a respectively different design layout.

* * * * *